United States Patent
Chen (10) Patent No.: US 9,591,448 B2
(45) Date of Patent: Mar. 7, 2017

(54) METHOD FOR GENERATING A TRACK FILE THAT CONTAINS NOTIFICATION INFORMATION, A COMPUTER PROGRAM PRODUCT, AND A NAVIGATION METHOD

(71) Applicant: Mitac International Corp., Taoyuan (TW)

(72) Inventor: Chung-Yu Chen, Taoyuan (TW)

(73) Assignee: MITAC INTERNATIONAL CORP., Taoyuan (TW)

( * ) Notice: Subject to any disclaimer, the term of this patent is extended or adjusted under 35 U.S.C. 154(b) by 0 days.

(21) Appl. No.: 14/721,473

(22) Filed: May 26, 2015

(65) Prior Publication Data
US 2015/0350834 A1    Dec. 3, 2015

(30) Foreign Application Priority Data
May 27, 2014    (TW) .............................. 103118419 A (51) Int. Cl.
*H04W 4/02*    (2009.01)
*H04W 68/00*    (2009.01)

(52) U.S. Cl.
CPC ......... *H04W 4/023* (2013.01); *H04W 68/005* (2013.01)

(58) Field of Classification Search
CPC ............................ H04W 4/023; H04W 68/005
USPC ............................................. 455/452.1, 456.1
See application file for complete search history.

(56) References Cited

U.S. PATENT DOCUMENTS

| 5,477,459 A | * | 12/1995 | Clegg ....................... G01S 5/16 356/152.1 |
| 2011/0172916 A1 | | 7/2011 | Pakzad et al. |
| 2012/0277985 A1 | | 11/2012 | Witmer |

FOREIGN PATENT DOCUMENTS

| TW | 201115118 A1 | 5/2011 |
| TW | 201144757 A1 | 12/2011 |
| TW | 201245667 A1 | 11/2012 |

OTHER PUBLICATIONS

Search Report dated May 11, 2015 in corresponding TW 103118419 and English language translation of same.

* cited by examiner

*Primary Examiner* — Inder Mehra
(74) *Attorney, Agent, or Firm* — Faegre Baker Daniels LLP (57) ABSTRACT

A method for generating a track file that contains notification information includes obtaining a raw track file and a road network data, determining whether each of consecutive two of recorded locations of the track file is on or off road segments of the road network data, generating a notification of change in road status when the consecutive two of the recorded locations are determined to be respectively on and off the road segments, calculating an included angle between two line segments which connect in sequence consecutive three of the recorded locations, determining whether the included angle is greater than a threshold value, and generating a notification of turning when the included angle is determined to be greater than the threshold value.

11 Claims, 4 Drawing Sheets

METHOD FOR GENERATING A TRACK FILE THAT CONTAINS NOTIFICATION INFORMATION, A COMPUTER PROGRAM PRODUCT, AND A NAVIGATION METHOD

CROSS-REFERENCE TO RELATED APPLICATION

This application claims priority of Taiwanese Patent Application No. 103118419, filed on May 27, the entire disclosure of which is hereby explicitly incorporated by reference herein.

FIELD

The disclosure relates to a technique associated with processing of existing data, more particularly to a method for generating a track file that contains notification information.

BACKGROUND

A conventional mobile electronic device, such as a navigation device, a smart phone and so forth, is usually provided with a Global Positioning System (GPS) functionality. Currently, a user may utilize the conventional mobile electronic device to record a series of locations in the form of GPS coordinates in a chronological order based on a predefined rule (e.g., to record a present location every ten seconds) while cycling, jogging and even walking, and the series of recorded locations are stored as a track file. Accordingly, the track file contains the GPS coordinates of the series of recorded locations in the chronological order.

The track file can be published on the Internet, such that another user may use a mobile electronic device provided with a navigation functionality to download and to read the track file. A track can be reproduced on an electronic map by marking the GPS coordinates contained in the track file on the electronic map. The track reproduced on the electronic map serves as a navigation route to instruct said another user to move past the sequence of recorded locations accordingly.

However, this track file provides limited information, and said another user can only determine whether to turn or whether to leave the current road on their own judgment according to the actual environment, such as when encountering a fork or an intersection in the road.

SUMMARY

Therefore, an object of the disclosure is to provide a method for generating a track file that contains notification information, a computer program product and a navigation method, which are associated with further processing of a raw track file so as to generate a tack file containing notification information. The track file thus generated, while being read, can provide notifications for a user as to whether to turn or to leave the road, and so forth.

In a first aspect of the disclosure, the method is configured for generating a track file that contains notification information. The method is to be implemented by a computing device, and includes the steps of:

obtaining a raw track file and a road network data, the raw track file including a sequence of recorded locations, the road network data including a plurality of road segments;

determining whether each of consecutive two of the recorded locations is on or off the road segments of the road network data;

for one of the consecutive two of the recorded locations, generating a notification of change in road status when the consecutive two of the recorded locations are determined to be respectively on and off the road segments;

calculating an included angle between two line segments which connect in sequence consecutive three of the recorded locations;

determining whether the included angle thus calculated is greater than a predefined threshold value;

for one of earlier two of the consecutive three of the recorded locations, generating another notification of turning when the included angle is determined to be greater than the predefined threshold value; and applying the rest of the recorded locations to the aforementioned steps to obtain a track file that contains notification information.

In a second aspect of the disclosure, the computer program product includes a non-transitory computer readable storage medium that includes program instructions, which when executed by a computing device, cause the computing device to perform a method for generating a track file that contains notification information. The method includes the steps of:

obtaining a raw track file and a road network data, the raw track file including a sequence of recorded locations, the road network data including a plurality of road segments;

determining whether each of consecutive two of the recorded locations is on or off the road segments of the road network data;

for one of the consecutive two of the recorded locations, generating a notification of change in road status when the consecutive two of the recorded locations are determined to be respectively on and off the road segments;

calculating an included angle between two line segments which connect in sequence consecutive three of the recorded locations;

determining whether the included angle thus calculated is greater than a predefined threshold value;

for one of earlier two of the consecutive three of the recorded locations, generating another notification of turning when the included angle is determined to be greater than the predefined threshold value; and applying the rest of the recorded locations to the aforementioned steps to obtain a track file that contains notification information.

In a third aspect of the disclosure, the navigation method is to be implemented by a navigation device, and includes the steps of:

reading a track file which contains a sequence of recorded locations and notification information corresponding respectively to the recorded locations;

receiving a Global Positioning System (GPS) data which represents a position of the navigation device;

comparing the GPS data with each of the recorded locations; and outputting the notification information upon determining that the position represented by the GPS data conforms or is adjacent to one of the recorded locations which corresponds to the notification information.

The track file that contains notification information is to be generated by a method including the steps of obtaining a raw track file and a road network data, the raw track file including the sequence of recorded locations, the road network data including a plurality of road segments, determining whether each of consecutive two of the recorded locations is on or off the road segments of the road network data, for one of the consecutive two of the recorded locations, generating a notification of change in road status when the consecutive two of the recorded locations are determined to be respectively on and off the road segments, calculating an included angle between two line segments which connect in sequence consecutive three of the recorded locations, determining whether the included angle thus calculated is greater than a predefined threshold value, for one of earlier two of the consecutive three of the recorded locations, generating another notification of turning when the included angle is determined to be greater than the predefined threshold value, and applying the rest of the recorded locations to the aforementioned steps to obtain a track file that contains notification information.

An effect of the disclosure resides in that, with respect to a raw track file that contains a sequence of recorded locations, the raw track file is processed in combination with road network data so that a more informative track file that contains notification information is generated. In this way, a user using the track file may be provided with favorable navigation assistance.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
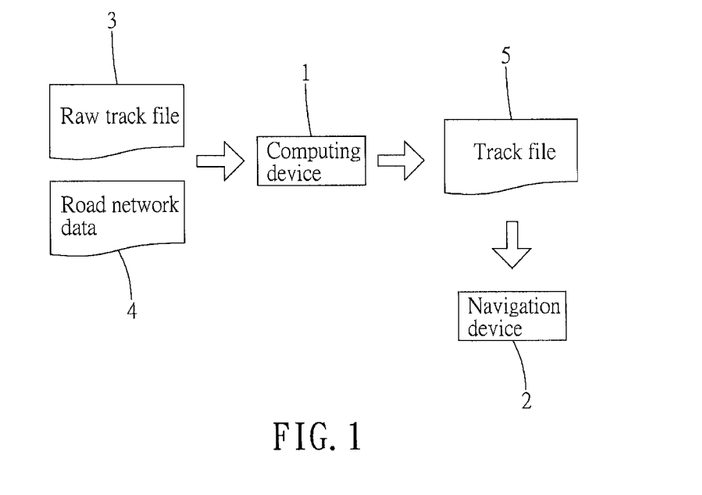
FIG. 1 is a schematic diagram illustrating data flow between a computing device and a navigation device.
Figure 2:
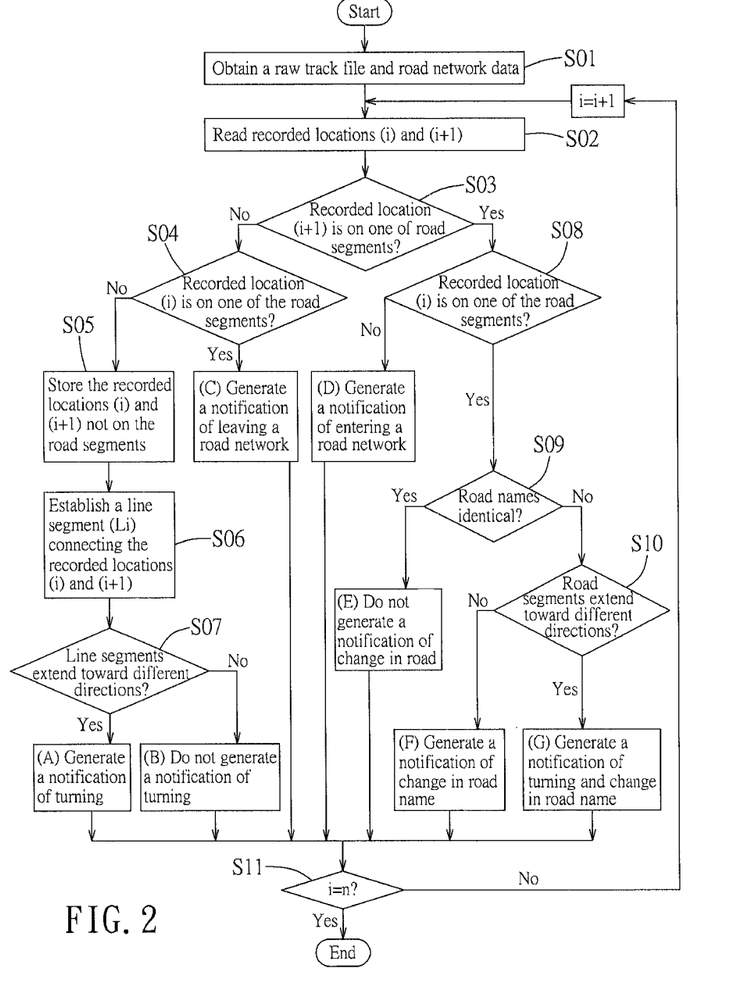
FIG. 2 is a flow chart illustrating an embodiment of a method for generating a track file that contains notification information according to the disclosure.

Referring to FIG. 1 and FIG. 2, an embodiment of a method for generating a track file that contains notification information according to the disclosure is to be implemented by a computing device 1. The computing device 1 may be one of a desktop computer, a tablet computer, a smart phone, etc. After loading a computer program, which is adapted for generating a track file that contains notification information, the computing device 1 is capable of executing the embodiment of the method for generating a track file that contains notification information as illustrated in FIG. 2 according to the disclosure. The aforementioned computer program, which is adapted for generating a track file that contains notification information, is exemplified in a form of an application program (APP), and is available for download and installation on the computing device 1 via a mobile network digital distribution platform, or may be stored in a form of any non-transitory storage medium to be read by the computing device 1.

The embodiment of the method for generating a track file that contains notification information includes the following steps. Each of recorded locations will go through the process of the method to determine a corresponding one of seven consequences (A), (B), (C), (D), (E), (F) and (G), in which consequences (A), (C), (D), (F) and (G) involve generation of distinct notification information, and no notification is provided in consequences (B) and (E).

In step S01, the computing device 1 is configured to obtain a raw track file 3 and road network data 4 by loading the same. The raw track file 3 includes a sequence of recorded locations. In this embodiment, the raw track file 3 includes (n) number of the recorded locations, each of which is assigned a respective serial number that is an integer ranging between 1 and (n). In this embodiment, the road network data 4 includes a vast variety of contents. Any information associated with roads may have already been or will be incorporated into the road network data 4 available from a map data provider. Therefore, the road network data 4 includes, but is not limited to, positions and coordinates thereof, as well as road segments, each of which interconnects corresponding two of the positions. For each of the road segments, the road network data 4 further stores a location, a shape and a road name of the road segment, an administrative district where the road segment is located, attributes of the road segment (e.g., the number of lanes, a width of each lane, a direction of traffic on the road segment, a turning rule, a speed limit, a category of vehicles allowed to be driven on the road segment, etc.), a road type of the road segment (e.g., a national highway, a provincial highway, a county highway, a country road, a regular road, etc.), a functionality of the road segment (e.g., an important link road, a regular road, a private road, etc.), and a material of road surface (e.g., a paved road, an unpaved road, a gravel road, a cobblestone road, etc.).

The road network data 4 further includes content associated with which one of the positions interconnects adjacent two or more of the road segments, and which one or ones of the road segments traffic on a current road segment in a specific direction may lead to. Accordingly, a plurality of road segments are collected to constitute the road network data.

In step S02, the computing device 1 is configured to read one of the recorded locations (i) and another one of the recorded locations (i+1) of the raw track file 3 (i.e., an $i^{th}$ one and an $(i+1)^{th}$ one of the recorded locations), in which (i) is an integer ranging between 1 and (n−1).

In step S03, the computing device 1 is configured to compare the recorded location (i+1) with the road network data 4, so as to determine whether the recorded location (i+1) is on one of the road segments of the road network data 4. When it is determined that the recorded location (i+1) is not on one of the road segments of the road network data 4, it means that the recorded location (i+1) is located on a trail not recorded in the road network data 4, or off a road, and the flow thus proceeds to step S04; otherwise, step S08 is performed.

In step S04, the computing device 1 is configured to compare the recorded location (i) with the road network data 4, so as to determine whether the recorded location (i) is on one of the road segments of the road network data 4. When it is determined that the recorded location (i) is not on one of the road segments of the road network data 4, it means that the consecutive two recorded locations (i) and (i+1) are both located on a trail not recorded in the road network data 4, or off a road, and the flow thus proceeds to step S05; otherwise, the flow leads to the consequence (C).

In the consequence (C), the computing device 1 is configured to generate a notification of leaving a road network for the recorded location (i), such that a user is provided with the notification of "leaving a road network" in advance while arriving at the recorded location (i). In practice, such notification of "leaving a road network" may be alternatively generated for the recorded location (i+1) such that the user is informed of having left the road network. Either scheme works, as long as the principle of notification generation is fixed.

In step S05, the computing device 1 is configured to store the recorded locations (i) and (i+1) which are not on the road segments of the road network data 4.

In step S06, the computing device 1 is configured to establish a line segment ($L_i$) which connects the recorded locations (i) and (i+1), and stores the line segment ($L_i$) thus established. The aforementioned steps S05 and S06 are pre-processing steps for determining variation in directions.

Figure 3:
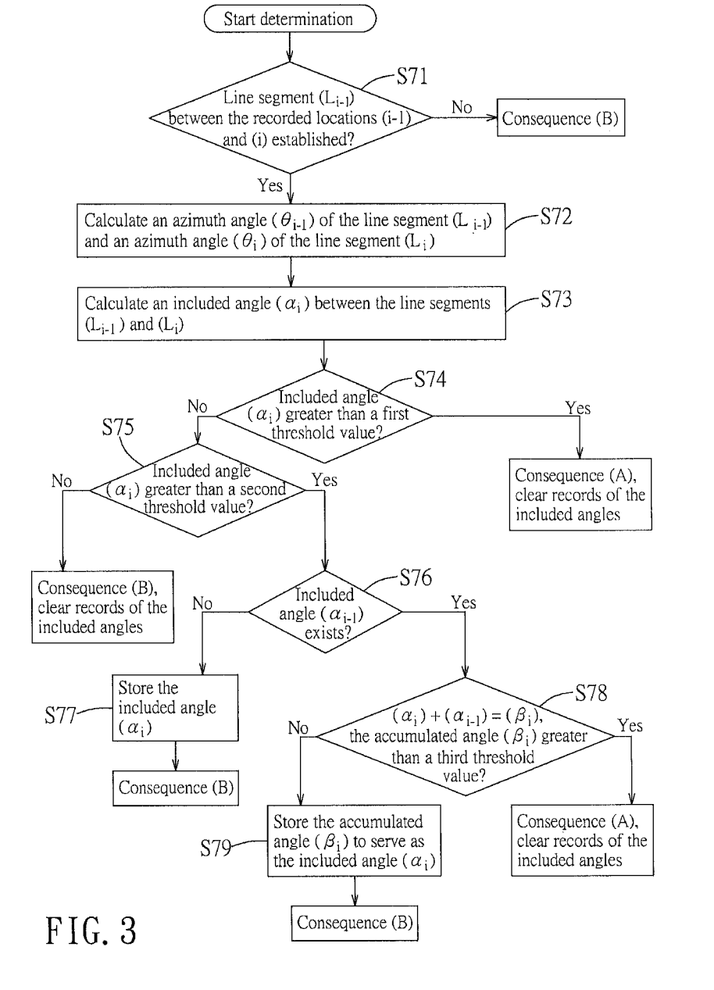
FIG. 3 is a flow chart illustrating detailed steps for determining whether line segments between consecutive recorded locations extend toward different directions.

In step S07, the computer device 1 is configured to determine whether line segments between consecutive recorded locations extend in different directions, i.e., whether a turn occurs. This step results in one of the consequence (A), in which a notification of turning is generated, and the consequence (B), in which it is determined that a turn does not occur, such that no such notification is generated by the computing device 1. Generally, since it is difficult for the user to determine whether or not to turn in an environment without any road, the determination as to whether a turn occurs is particularly made in this embodiment of the disclosure for the recorded locations of the raw track file 3 which are located on, e.g., a trail not recorded in the road network data 4, or off a road. Detailed steps of this determination (i.e., sub-steps of step S07) are illustrated in FIG. 3.

In step S71, since the line segment ($L_i$) connecting the recorded locations (i) and (i+1) has been obtained, the computing device 1 is configured to determine whether a line segment ($L_{i-1}$) connecting a recorded location (i−1) (i.e., an (i−1)$^{th}$ one of the recorded locations of the raw rack file 3) and the recorded location (i) has been established and stored. It is noted that in this step, (i) is an integer ranging between 2 and (n−1). When it is determined that the line segment ($L_{i-1}$) has been established and stored, it means that the previously processed recorded location (i−1) (i.e., the (i−1)$^{th}$ one of the recorded locations) is also off the road and should be considered altogether while determining whether a turn occurs, and the flow proceeds to step S72; otherwise, it means that the previously processed recorded location (i−1) is on one of the road segments of the road network data 4, and there are no consecutive three of the recorded locations off the road. As a result, the flow leads to the consequence (B), in which no notification of turning is generated.

In step S72, the computing device 1 is configured to calculate an azimuth angle ($\theta_{i-1}$) of the line segment ($L_{i-1}$) between the recorded locations (i−1) and (i), and to calculate an azimuth angle ($\theta_i$) of the line segment ($L_i$) between the recorded locations (i) and (i+1).

In step S73, the computing device 1 is configured to calculate an included angle ($\alpha_i$) between the line segments ($L_{i-1}$) and ($L_i$) according to the azimuth angles ($\theta_{i-1}$) and ($\theta_i$) calculated in step S72, for example, a difference between the azimuth angles ($\theta_i$) and ($\theta_{i-1}$).

In step S74, the computing device 1 is configured to determine whether the included angle ($\alpha_i$) is greater than a predefined first threshold value close to 90 degrees, for example, 70 degrees. When it is determined that the included angle ($\alpha_i$) is greater than the first threshold value, it means that the consecutive three of the recorded locations (i−1), (i) and (i+1) constitute a relatively large turn, and the flow leads to the consequence (A). Therefore, a notification of turning is generated for the recorded location (i), so as to notify the user about a turn while the user arrives at the recorded location (i). However, in practice, the notification of turning may be generated for the recorded location (i−1), such that the user may be notified in advance of the turn. Variations in implementation are permissible, as long as the principle of notification generation is fixed. Specifically, meanwhile, all records of the included angles should be cleared, including the included angle ($\alpha_i$) and an included angle ($\alpha_{i-1}$), which will be explained hereinafter.

In step S75, when it is determined in step S74 that the included angle ($\alpha_i$) is not greater than the first threshold value, the computing device 1 is configured to determine whether the included angle ($\alpha_i$) is greater than a second threshold value that is smaller than the first threshold value, for example, 10 degrees. One purpose of this step resides in that, sometimes, a turn may occur in a progressive manner, such as an arc, and this type of turn should also be provided with a corresponding notification. When it is determined in step S75 that the included angle ($\alpha_i$) is not greater than the second threshold value, it means that the included angle ($\alpha_i$) is insignificant, and the flow leads to the consequence (B), in which no notification of turning is generated; meanwhile, all records of included angles are cleared.

In step S76, when it is determined in step S75 that the included angle ($\alpha_i$) is greater than the second threshold value, it means that even though the included angle ($\alpha_i$) does not per se result in a significant turn, the included angle ($\alpha_i$) still contributes to a meaningful variation in direction. Therefore, the computing device 1 is configured to determine whether there exists a previously-calculated included angle ($\alpha_{i-1}$), that is to say, an included angle calculated by virtue of the recorded locations (i−2), (i−1) and (i). When it is determined that the previously-calculated included angle ($\alpha_{i-1}$) does not exist, it means that the recorded locations (i−1), (i) and (i+1) might be starting points of a progressive turn, and the flow proceeds to step S77; otherwise, the flow proceeds to step S78.

In step S77, the computing device 1 is configured to store the included angle ($\alpha_i$), and the flow leads to the consequence (B), in which no notification of turning is generated. If a subsequent recorded location is processed in the next instance of step S76, if any, the included angle ($\alpha_i$) thus stored may serve as the previously-calculated included angle for the subsequent recorded location.

In step S78, the computing device 1 is configured to add the included angle ($\alpha_i$) to the previously-calculated included angle ($\alpha_{i-1}$) to obtain an accumulated angle ($\beta_i$), and to determine whether the accumulated angle ($\beta_i$) is greater than a third threshold value (for example, 45 degrees). When it is determined that the accumulated angle ($\beta_i$) is greater than the third threshold value, it means that the turn is large enough, and the flow leads to the consequence (A), in which a notification of turning is generated for the recorded location (i), such that the user may be confirmed of the turn, but in practice, generating the notification of turning is not limited to being for the recorded location (i) and meanwhile, all records of included angles are cleared; otherwise, the flow proceeds to step S79.

Figure 4:
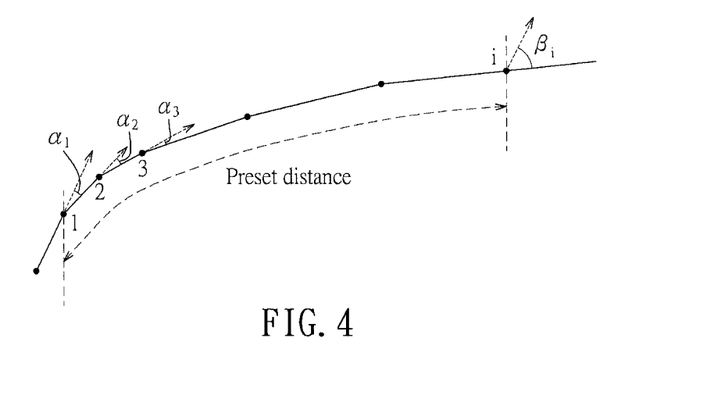
FIG. 4 illustrates that an accumulated angle is associated with a sum of included angles of a portion of recorded locations within a preset distance along a raw track file.

In one embodiment, the accumulated angle ($\beta_i$) is associated with a sampling frequency of the recorded locations in the raw track file 3, and may be associated with a sum of the included angles of a portion of the recorded locations within a preset distance along the raw track file 3 (see FIG. 4). The sampling frequency and the preset distance may be determined based on heuristic techniques. In this way, a variation in moving direction may be obtained based on the accumulated angle ($\beta_i$).

In step S79, when it is determined that the accumulated angle ($\beta_i$) is not greater than the third threshold value, the accumulated angle ($\beta_i$) is stored to serve as the included angle ($\alpha_i$). In this way, if a subsequent recorded location is processed in the next instance of step S76, an effect of accumulation of the included angles may be achieved. Subsequent to step S79, the flow leads to the consequence (B), in which no notification of turning is generated.

The detailed steps of the determination made in step S07 are illustrated by the aforementioned steps S71 to S79. Referring back to FIG. 2, a scenario that the recorded location (i+1) is on the road is explained hereinafter.

In step S08, the computing device 1 is configured to compare the recorded location (i) with the road network data 4, so as to determine whether the recorded location (i) is on one of the road segments of the road network data 4. When it is determined that the recorded location (i) is not on one of the road segments of the road network data 4, it means that the recorded location (i) is not on the road segments but the recorded location (i+1) is on the road segments. Therefore, a road status as to whether the recorded location is on the road segments of the road network data 4 transitions as one progresses from the recorded location (i) to the recorded location (i+1), and the flow leads to the consequence (D), in which the computing device 1 is configured to generate a notification of entering a road network for the recorded location (i).

When it is determined in step S08 that the recorded location (i) is on one of the road segments of the road network data 4, it means that the consecutive two recorded locations (i) and (i+1) are both on the road segments of the road network data 4, and the flow proceeds to step S09, in which the computing device 1 is configured to determine whether the road names of the road segments on which the consecutive two recorded locations (i) and (i+1) are located are identical. When it is determined that the road names are identical, it means that there is no change in road between the two recorded locations (i) and (i+1), and the flow leads to the consequence (E), in which the computing device 1 does not generate a notification related to changing roads. Otherwise, the flow proceeds to step S10.

In step S10, the computing device 1 is configured to determine, according to the road network data 4, whether the road segments on which the consecutive two recorded locations (i) and (i+1) are located extend toward different directions, i.e., whether a turn occurs between the road segments. A practical determination technique adopted in this step may be any current processing approach for determining whether two roads extend toward different directions. Alternatively, steps S73 to S74 may be utilized for determining an included angle between two roads. Therefore, this embodiment is not limited to any specific determination approach. When it is determined in this step that the road segments do not extend toward different directions, the flow leads to the consequence (F), in which the computing device 1 is configured to generate a notification of change in road name. When it is determined in this step that the road segments extend toward different directions, the flow leads to the consequence (G), in which the computing device 1 is configured to generate a notification of turning and change in road name.

Figure 5:
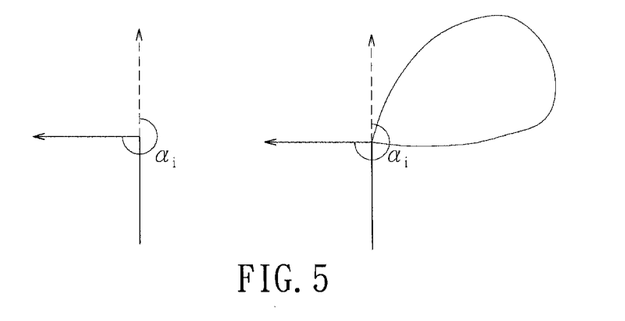
FIG. 5 illustrates a merit of determining whether a turn occurs based on the accumulated angle.

It is noted that S72 to S79 may also be utilized to implement step S10. In this case, calculation of the accumulated angle ($\beta_i$) is further associated with widths of the road segments on which the consecutive two recorded locations (i) and (i+1) are located, such as a road width of 15 meters and a road width of 30 meters. One purpose of comparing the accumulated angle ($\beta_i$) with the third threshold value is to exclude a scenario that a user is moving along a twisting path with many turns on the road segments without leaving the road segments of the road network data 4. FIG. 5 illustrates a merit of determining whether a turn occurs based on the accumulated angle ($\beta_i$) for distinguishing a scenario shown at the right side of FIG. 5 from a scenario shown at the left side thereof.

After one of the aforementioned consequences has been obtained, the flow proceeds to step S11.

In step S11, the computing device 1 is configured to determine whether the integer (i) is equal to the number (n). When it is determined that the integer (i) is equal to the number (n), it means that all of the recorded locations of the raw track file 3 have been processed. Therefore, procedure of the method of this disclosure ends, and a track file 5 (see FIG. 1) that contains notification information (i.e., the aforementioned notifications generated by the computing device 1) is obtained. When it is determined that the integer (i) is not equal to the number (n), an increment operation (i.e., i=i+1) is performed, and the flow goes back to step S02.

The track file 5 that contains the notification information can be published on the Internet, such that another user may use a navigation device 2 (see FIG. 1) to download and to read the track file 5. A track can be reproduced on an electronic map by marking GPS coordinates of the recorded locations contained in the track file 5 on the electronic map. The track reproduced on the electronic map may serve as a navigation route to instruct said another user to move past the sequence of recorded locations accordingly. The navigation device 2 refers to a tablet computer, a smart phone, or any dedicated device for navigation that is provided with navigation capability.

The navigation device 2 is configured to read the track file 5 that contains the notification information and that is generated by the aforementioned method, to receive a GPS data which represent a position of the navigation device 2, and to compare the GPS data with each of the recorded locations in the track file 5. When it is determine that the position represented by the GPS data conforms or is adjacent to one of the recorded locations which is provided with the notification information, the navigation device 2 outputs the notification information corresponding to said one of the recorded locations.

To sum up, with respect to a raw track file that contains a sequence of recorded locations, the raw track file is processed in combination with road network data so that a more informative track file that contains notification information is generated. In this way, the user may be provided with favorable navigation assistance.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for generating a track file that contains notification information, the method to be implemented by a computing device and comprising the steps of:

obtaining a raw track file and road network data, the raw track file including a sequence of recorded locations, the road network data including a plurality of road segments;

determining whether each of consecutive two of the recorded locations is on or off the road segments of the road network data;

for one of the consecutive two of the recorded locations, generating a notification of change in road status when the consecutive two of the recorded locations are determined to be respectively on and off the road segments;

calculating an included angle between two line segments which connect in sequence consecutive three of the recorded locations;

determining whether the included angle thus calculated is greater than a predefined threshold value;

for one of earlier two of the consecutive three of the recorded locations, generating another notification of turning when the included angle is determined to be greater than the predefined threshold value; and applying the rest of the recorded locations to the aforementioned steps to obtain a track file that contains notification information.

2. The method of claim 1, wherein the step of calculating an included angle includes calculating an included angle ($\alpha_i$) between a line segment ($L_{i-1}$) which connects an $(i-1)^{th}$ one and an $i^{th}$ one of the recorded locations and a line segment ($L_i$) which connects the $i^{th}$ one and an $(i+1)^{th}$ one of the recorded locations;

wherein the step of determining whether the included angle thus calculated is greater than a predefined threshold value includes determining whether the included angle ($\alpha_i$) is greater than a first threshold value close to 90 degrees;

wherein the step of generating another notification of turning includes clearing a record of the included angle ($\alpha_i$); and wherein the raw track file includes (n) number of the recorded locations, and (i) is an integer ranging between 2 and (n−1).

3. The method of claim 2, wherein the step of determining whether the included angle thus calculated is greater than a predefined threshold value further includes:

determining whether the included angle ($\alpha_i$) is greater than a second threshold value smaller than the first threshold value when it is determined that the included angle ($\alpha_i$) is not greater than the first threshold value;

adding the included angle ($\alpha_i$) to a previously-calculated included angle ($\alpha_{i-1}$) to obtain an accumulated angle; and wherein the step of generating another notification of turning further includes clearing records of the included angle ($\alpha_i$) and the previously-calculated included angle ($\alpha_{i-1}$) upon determining that the accumulated angle is greater than a third threshold value.

4. The method of claim 1, wherein in the step of generating a notification of change in road status includes:

generating a notification of leaving a road network when an earlier one of the consecutive two of the recorded locations is determined to be on the road segments and a later one of the consecutive two of the recorded locations is determined to be off the road segments.

5. The method of claim 1, wherein in the step of generating a notification of change in road status includes:

generating a notification of entering a road network when an earlier one of the consecutive two of the recorded locations is determined to be off the road segments and a later one of the consecutive two of the recorded locations is determined to be on the road segments.

6. The method of claim 1, the road network data further including road names corresponding respectively to the road segments, the method, subsequent to the step of determining whether each of consecutive two of the recorded locations is on or off the road segments, further comprising:

determining whether the road names of the road segments on which the consecutive two of the recorded locations are located are identical when it is determined that each of the consecutive two of the recorded locations is on the road segments; and generating a notification of change in road name when it is determined that the road names of the road segments on which the consecutive two of the recorded locations are located are not identical.

7. The method of claim 6, wherein the step of generating a notification of change in road name includes:

determining whether the road segments on which the consecutive two of the recorded locations are located extend toward different directions; and generating a notification of turning and change in road name when it is determined that the road segments on which the consecutive two of the recorded locations are located extend toward different directions.

8. A computer program product comprising a non-transitory computer readable storage medium that includes program instructions, which when executed by a computing device, cause the computing device to perform a method for generating a track file that contains notification information, the method including the steps of:

obtaining a raw track file and road network data, the raw track file including a sequence of recorded locations, the road network data including a plurality of road segments;

determining whether each of consecutive two of the recorded locations is on or off the road segments of the road network data;

for one of the consecutive two of the recorded locations, generating a notification of change in road status when the consecutive two of the recorded locations are determined to be respectively on and off the road segments;

calculating an included angle between two line segments which connect in sequence consecutive three of the recorded locations;

determining whether the included angle thus calculated is greater than a predefined threshold value;

for one of earlier two of the consecutive three of the recorded locations, generating another notification of turning when the included angle is determined to be greater than the predefined threshold value; and applying the rest of the recorded locations to the aforementioned steps to obtain a track file that contains notification information.

9. A navigation method to be implemented by a navigation device, and comprising the steps of:

reading a track file which contains a sequence of recorded locations and notification information corresponding respectively to the recorded locations;

receiving a Global Positioning System (GPS) data which represents a position of the navigation device;

comparing the GPS data with each of the recorded locations; and outputting the notification information upon determining that a position of the navigation device represented by the GPS data conforms or is adjacent to one of the recorded locations which corresponds to the notification information;

wherein the track file that contains notification information is to be generated by a method including the steps of     obtaining a raw track file and road network data, the raw track file including the sequence of recorded locations, the road network data including a plurality of road segments,     determining whether each of consecutive two of the recorded locations is on or off the road segments of the road network data,     for one of the consecutive two of the recorded locations, generating a notification of change in road status when the consecutive two of the recorded locations are determined to be respectively on and off the road segments,     calculating an included angle between two line segments which connect in sequence consecutive three of the recorded locations,     determining whether the included angle thus calculated is greater than a predefined threshold value,     for one of earlier two of the consecutive three of the recorded locations, generating another notification of turning when the included angle is determined to be greater than the predefined threshold value, and     applying the rest of the recorded locations to the aforementioned steps to obtain a track file that contains notification information.

10. The navigation method of claim 9, wherein generating a notification of change in road status includes:

generating a notification of leaving a road network when an earlier one of the consecutive two of the recorded locations is determined to be on the road segments and a later one of the consecutive two of the recorded locations is determined to be off the road segments.

11. The navigation method of claim 10, wherein generating a notification of change in road status includes:

generating a notification of entering a road network when an earlier one of the consecutive two of the recorded locations is determined to be off the road segments and a later one of the consecutive two of the recorded locations is determined to be on the road segments.

\* \* \* \* \*